United States Patent [19]

Lalikos et al.

[11] Patent Number: 4,813,716
[45] Date of Patent: Mar. 21, 1989

[54] QUICK CONNECT END FITTING

[75] Inventors: James M. Lalikos, Springfield; Rudolph A. Adamczyk, Ludlow, both of Mass.

[73] Assignee: Titeflex Corporation, Springfield, Mass.

[21] Appl. No.: 93,147

[22] Filed: Sep. 2, 1987

Related U.S. Application Data

[63] Continuation-in-part of Ser. No. 40,798, Apr. 21, 1987, abandoned.

[51] Int. Cl.[4] .............................................. F16L 55/00
[52] U.S. Cl. .................................... 285/174; 285/305; 285/915
[58] Field of Search ............... 285/174, 305, 915, 276, 285/924; 403/326, 377; 411/517, 522

[56] References Cited

U.S. PATENT DOCUMENTS

| 3,298,409 | 1/1967 | Elson | 403/377 X |
|---|---|---|---|
| 3,314,696 | 4/1967 | Ferguson et al. | 285/174 |
| 3,595,123 | 7/1971 | Wurzel | 411/517 |
| 3,759,553 | 9/1973 | Carter | 285/305 X |
| 3,784,235 | 1/1974 | Kessler | 285/915 |
| 4,009,896 | 3/1977 | Brewer | 285/305 |
| 4,059,295 | 11/1977 | Helm | 285/305 |
| 4,244,608 | 1/1981 | Stuemky | 285/305 |
| 4,632,434 | 12/1986 | Proctor et al. | 285/305 X |
| 4,707,000 | 11/1967 | Torgarch | 285/305 |

Primary Examiner—Dave W. Arola
Attorney, Agent, or Firm—Louis Bernat

[57] ABSTRACT

A quick connect/disconnect end fitting has two telescoping parts which are locked together by a wire loop which fits through diametrically opposed slots in an outer one of the parts and into a groove in the inner one of the parts. When opposing tips at the end of the loop are squeezed together, the wire loop leaves the groove to enable the two telescoping parts to be separated. An O-ring seals the space between the telescoping parts.

9 Claims, 1 Drawing Sheet

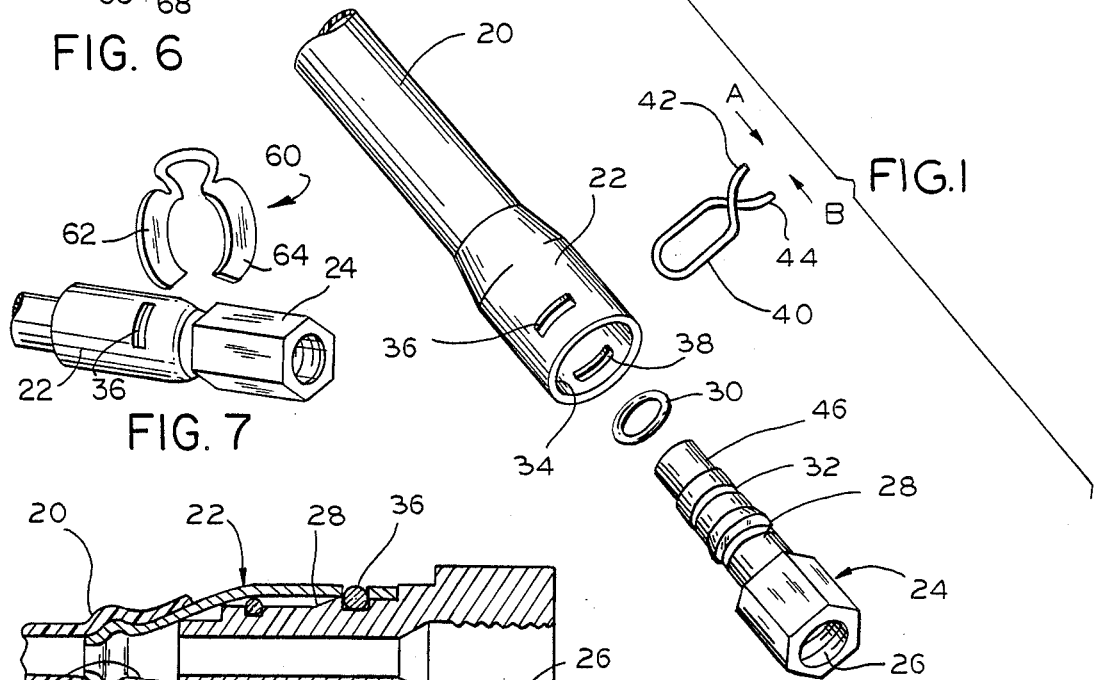

QUICK CONNECT END FITTING

This is a continuation-in-part of U.S. Patent Application Ser. No. 07/040,798, filed Apr. 21, 1987, now abandoned, and entitled "QUICK CONNECT END FITTING."

This invention relates to end fittings and, more particularly, to end fittings which may be quickly and easily attached to and detached from the end of a tube or hose, with a minimum of effort.

There are many different types and species of end fittings, each serving either a general or a specific need. Thus, a great flexibility in design parameters is to be desired. For example, among other uses, the aerospace industry needs these fittings for very exacting and demanding specifications, often in hostile environments. One characteristic of such an end fitting is that it should be sealed to the end of a tube or hose and also should be adapted to be turned onto a threaded nipple. Each time that the threaded end is attached to or removed from the nipple, minor nicks and dents appear on the threads and face seals. As a result, in a demanding environment, the end fitting and the threaded nipple must be replaced fairly often if the end fittings are attached and detached very many times. Therefore, there is a need not to apply the end fitting to or remove it from the threaded nipple any more times than is absolutely necessary. Still, there may be a need to attach or detach the tube or hose many times. Thus, there should be some way of accomplishing this attachment and detachment without having to open and close the threaded joint.

Another consideration is the time required to attach or detach the tube or hose. If it is necessary to open and close a threaded joint, the task may require many minutes. There are great chances of damage, as from cross-threading, insufficient tightening, over-tightening and the like. On the other hand, if it is possible to simply pull the tube off or to push it onto the end fitting, the task requires only a few seconds. If there is nothing to do except slide one end into another, there is nothing to over-tighten or to remain too loose.

Yet another consideration is reliability. In the automotive industry, for example, there are many mechanical stresses, much vibration, extremes of temperatures, and the like. All of these things are inducements for joints to leak or to otherwise fail. On the other hand, this automotive industry is among the most demanding and the least tolerant of leaks, spills, and similar failures which could lead to accidents. Therefore, for whatever standards and parameters that may prevail for any given end fitting, there should be a predictability that those standards will be met and that their maintenance will continue and prevail.

Accordingly, an object of this invention is to provide for new and improved end fittings meeting these and similar needs. Here, an object is to provide end fittings which enable a quick and easy attachment, removal and replacement of tubes and hoses. In this connection, an object is to provide end fittings with predictable and maintainable standards and parameters.

Another object of the invention is to provide reliably sealed joints which resist leaking.

In keeping with an aspect of the invention, these and other objects are accomplished by providing an end piece having a conventional connector, such as any suitable threads, a bayonette connector, or the like, for completing any suitable attachment to an adjoining part. On the end opposite the connector, the end piece has a capture groove and an O-ring for making a seal. The end of a tube or hose has attached thereto a cylindrical end which receives, fits over, and captures the opposite end of the end piece and completes a seal against the O-ring. A looped wire spring clip may be squeezed to open the loop or released to close the loop. When the squeezed clip has an open loop configuration, the opposite end of the end piece may pass through it as far as the capture groove. When the looped wire spring is released, the loop closes to seize the capture groove. Various gaskets and seals may be added to provide alternative or special purpose seals.

An embodiment of the invention is shown in the attached drawing, wherein:

FIG. 1 is an exploded view in perspective of the inventive end fitting;

FIG. 2A is a cross section of a first and preferred embodiment of the end of the tube, its end cylinder, and the end piece in an assembled condition;

FIG. 2B is a cross-sectional view of a second embodiment of the end of the tube, its end cylinder and the end piece, in an assembled condition;

FIG. 3 is a perspective view of the end piece attached to the hose or tube;

FIGS. 4, 5 are fragmentary cross sections which are similar to FIG. 2, but show alternative positions for seals and gaskets.

FIG. 6 is a plan view of a commercially available snap ring; and

FIG. 7 is a perspective view of the end fitting and a snap ring which is about to be installed therein.

In FIG. 1, a tube or hose 20 has a cylindrical end 22 attached thereto. On one end, an end piece 24 has any suitable conventional connector, such as threads 26. Any suitable washer, gasket, or the like (not shown) may be used with this end fitting. A capture groove 28 and O-ring 30 are at the opposite end. The threads 26 are here shown as being internal within the end piece; however, they could also be external on the end piece 24. Or there could be some other kind of conventional connector, such as a bayonette connector.

The O-ring 30 fits into a groove 32 on the end fitting 24. When the end piece 24 is slipped into the open end 34 of the cylindrical end 22, and the two parts are telescoped together, the O-ring 30 makes a sliding fit which seals the joint between the end piece 24 and the cylindrical end 22.

The cylindrical end 22 has a pair of diametrically opposed slots 36, 38, in which a looped wire spring 40 fits. When the loop 40 is in the slots 36, 38, the sides of the loop extend into the bore of end cylinder 22 to fit into the capture groove 28, and to embrace the end piece. The looped spring 40 terminates in opposed tips 42, 44. When the tips 42, 44 are squeezed together in directions A, B, the loop 40 opens and its sides recede from the bore of the end cylinder 22, far enough to escape the capture groove 28 and, thus, to release the end piece. When the tips 42, 44 are released, the spring memory causes the loop to close and to re-enter the bore of end cylinder via slots 36, 38. If the end piece is then present, the sides of loop 40 enter into the capture groove.

To install the end piece 24 in the cylindrical end 22, the tips 42, 44 are squeezed together to open the loop 40. The nose end 46 of end piece 24 may now pass through the open loop 40 far enough for the capture groove 28 to come to rest inside loop 40. When the tips 42, 44 are released, the loop 40 closes over the end piece 24 and nests in the capture groove 28. Thereafter, the end piece 24 cannot be pulled out of end cylinder 22 unless the tips 42, 44 are again squeezed together to spread the loop 40 and thereby provide enough space, which allows the loop 40 to be pulled free of the capture groove 28.

The tube or hose 20 is made of any suitable material, such as nylon (polyhexamethyleneadipamide) manufactured by Rylson Industries Inc. (Rylson product identification AESN P10 TL). Other types of high performance structural plastics may be used as the Du Pont GRZ glass-reinforced Zytel nylon and the Du Pont Zytel ST super tough nylon. Further, the Du Pont acetal homopolymer, Delrin, may be usable in the construction of the tube or hose 20 and other interacting structural components. A section of the end of this tubing is heated to a temperature in the range of 250° to 275° F. in order to soften it in the area which is to be enlarged sufficiently to receive nose 45 of the end cylinder 22 (FIGS. 2A and 2B).

As soon as the tubing reaches a desired degree of softness, a nose on a mandrel in the form and shape of the end cylinder 22 is pressed into the end of the tube to a depth which is necessary for completing an attachment of the hose 20 to the end cylinder 22. The mandrel is allowed to dwell long enough (about 30 seconds) to absorb a sufficient amount of heat from the tubing for it to cool and permanently set in the shape of the mandrel. Then, the mandrel is removed while the tubing retains its new shape. This method works very well in small-scale production; however, there are more sophisticated methods of shaping the end of the tubing which may be adopted in large-scale production.

In the preferred embodiment of FIG. 2A, the nose end 46 of the end piece 24 is slipped into the shaped end of the hose 20. The end cylinder 22 is fitted over and may be bonded or mechanically locked to the external surface of the hose 20. The O-ring 30 makes its sealing contact against the interior surface of the nylon, or similar elastomer hose.

In a second embodiment of FIG. 2B, the nose 45 of end cylinder 22 is fitted into the shaped end of tube 20 and there is secured in position, as by cementing or bonding the interior of the tubing over the exterior of end cylinder 22. Another technique is to crimp a band around the exterior of the tubing.

The main seal of the end fitting is provided by the O-ring 30, which seats itself with a sliding fit between the exterior wall of end piece 24 and the interior of the hose 20 (FIG. 2A) or end cylinder 22 (FIG. 2B). However, this O-ring seal 30 may be augmented or replaced by other seals. For example, in FIG. 4, a gasket or O-ring 50 engages and is compressed by the nose or end 52 of the end piece 24. In FIG. 5, the gasket or O-ring 54 engages and seals a gap between shoulder 56 on end piece 24 and the end 58 on the end cylinder 22. The use of O-ring 54 still depends upon an O-ring at 30 for the seal, since the slots 36, 38 defeat a leak-proof seal at O-ring 54. Nevertheless, O-ring 54 keeps foreign matter from entering the gap between end piece 24 and end cylinder 22 and generally maintains a cleaner interior within end cylinder 22, which, in turn, helps make a better seal at 30.

When used alone, the O-ring 30 provides the easiest operation with the least amount of insertion force, since the only force required is that involved in making a sliding fit at O-ring 30. The O-ring seal 50 requires a much greater insertion force, since the O-ring is compressed. However, this forceful compression also makes a tighter seal.

In another embodiment (FIGS. 6, 7), a snap ring 60 replaces the wire spring loop 40. The snap ring 60 has two fairly heavy and rigid side plates 62, 64, which terminate on one end in somewhat funnel-shaped cam surfaces 66, 68. The other end of the side plates 62, 64 are joined by a thin spring section 70. The inside contours 72, 74 of plates 62, 64 encircle and embrace groove 28.

When the end piece 24 (FIG. 7) is fitted into the cylindrical end 22 and when the groove 28 is aligned with the opposed slots, the cam surfaces 66, 68 are pressed through the slots 36, 38 and against the groove 28. The spring section 70 gives enough for the snap ring to fit over the end piece and to come to rest with the contours 72, 74 embracing the part 24. The snap ring 60 may be removed from the fitting by using pliers to pull the spring 70.

Those who are skilled in the art will readily perceive how modifications may be made in the invention. Therefore, the appended claims should be construed to cover all equivalents reasonably falling within the spirit and the scope of the invention.

The claimed invention is:

1. An end fitting comprising a hose having an expanded section sealed within and on an end of an elongated end cylinder having a generally smooth bore therein, the outside surface of said expanded hose section being bonded to an internal wall of said generally smooth bore in said end cylinder, a pair of opposed slots formed in said end cylinder, a spring catch fitting in said pair of slots and entering into said bore of said cylinder when said spring is relaxed, said spring closing responsive to its own spring memory when in said slot, an end piece having a form and shape which slides into said expanded section of said hose, a capture groove formed on said end piece for engaging and capturing said spring when said spring enters said bore, said capture groove having a configuration which escapes said spring when said spring opens, and means for sealing the space between said end piece and the interior of said expanded section of said hose.

2. The end fitting of claim 1 wherein said sealing means is an O-ring carried by said end piece.

3. The end fitting of claim 1 and connector means associated with said end piece for making an attachment to a cooperating nipple.

4. The end fitting of claim 1 and resilient means at an end of said end piece for being compressed to form a seal when said end piece is locked in place within said expanded hose section.

5. A quick connect/disconnect end fitting comprising two telescoping parts, an expanded tubing section bonded to a first of said parts and forming an inside wall between said telescoping parts, one of said parts having a connector for making an attachment to adjacent equipment, a wire spring loop surrounding said telescoped parts and fitting into cooperating grooves and slots in said two parts for interconnecting and joining them, means for selectively spreading said wire spring loop to enable said two parts to slide apart or for relaxing said wire spring to enable said wire spring to interconnect said grooves and slots to lock said two parts together, and means for sealing the space between a second of said telescoped parts and said expanded tubing.

6. The end fitting of claim 5 wherein said tubing is a thermal setting plastic material which is shaped to fit the contours of a space between said telescoping parts and is bonded on one of its sides to said first of said parts, said sealing means is an O-ring between the unbonded side of said tubing and the other of said parts.

7. The end fitting of claim 5 wherein said tubing is a thermal setting plastic material which is shaped to fit against and conform to surface contours of said first of said parts.

8. The end fitting of claim 5 wherein said tubing is a thermal setting plastic material which is shaped to fit into and be bonded inside said first of said parts.

9. The end fitting of claim 5 wherein said wire spring is a snap ring having a somewhat C-shape for snapping into said grooves and slots.

* * * * *